United States Patent
Darabi et al.

(10) Patent No.: US 7,899,423 B2
(45) Date of Patent: *Mar. 1, 2011

(54) METHOD AND SYSTEM FOR A SYNTHESIZER/LOCAL OSCILLATOR GENERATOR (LOGEN) ARCHITECTURE FOR A QUAD-BAND GSM/GPRS RADIO

(75) Inventors: Hooman Darabi, Irvine, CA (US); John Leete, Huntington Beach, CA (US)

(73) Assignee: Broadcom Corp.

( * ) Notice: Subject to any disclaimer, the term of this patent is extended or adjusted under 35 U.S.C. 154(b) by 0 days.

This patent is subject to a terminal disclaimer.

(21) Appl. No.: 12/405,949

(22) Filed: Mar. 17, 2009

(65) Prior Publication Data

US 2009/0181631 A1 Jul. 16, 2009

Related U.S. Application Data

(63) Continuation of application No. 10/977,005, filed on Oct. 29, 2004, now Pat. No. 7,505,749.

(51) Int. Cl.
*H04B 1/40* (2006.01)
(52) U.S. Cl. ............... 455/258; 455/255; 455/168.1
(58) Field of Classification Search ............ 455/132, 455/168.1, 176.1, 180.1, 180.3, 188.1, 189.1, 455/190.1, 191.2, 255, 256, 257, 258, 259, 455/260, 264, 265

See application file for complete search history.

(56) References Cited

U.S. PATENT DOCUMENTS

| | | | |
|---|---|---|---|
| 6,215,988 B1 | 4/2001 | Matero | |
| 6,229,399 B1 | 5/2001 | Tobise et al. | |
| 6,661,267 B2* | 12/2003 | Walker et al. | 327/159 |
| 6,785,525 B2 | 8/2004 | Ries | |
| 7,003,274 B1 | 2/2006 | Olip | |
| 7,103,337 B2* | 9/2006 | Uozumi et al. | 455/255 |
| 2003/0203743 A1 | 10/2003 | Sugar et al. | |
| 2004/0053595 A1* | 3/2004 | Shinbo et al. | 455/316 |
| 2005/0266806 A1 | 12/2005 | Soe et al. | |
| 2006/0286939 A1 | 12/2006 | Yamawaki et al. | |
| 2007/0112904 A1 | 5/2007 | Kasperkovitz | |

* cited by examiner

*Primary Examiner* — Blane J Jackson
(74) *Attorney, Agent, or Firm* — McAndrews, Held & Malloy, Ltd.

(57) ABSTRACT

A method for processing signals is disclosed and may include performing using one or more circuits in a multiband radio, functions including receiving an input signal from an oscillator that generates signals for each of a plurality of bands handled by the multiband radio. The received input signal may be divided. A feedback loop reference signal may be generated from the input signal. A coarse calibration signal and/or a fine calibration signal may be generated from the generated feedback loop reference signal. The oscillator may be calibrated utilizing the coarse calibration signal and/or the fine calibration signal. The input signal generated by the oscillator may be between about 3.4 GHz and 4 GHz. The receive input signal may be buffered. The generated feedback loop reference signal may also be buffered.

16 Claims, 3 Drawing Sheets

METHOD AND SYSTEM FOR A SYNTHESIZER/LOCAL OSCILLATOR GENERATOR (LOGEN) ARCHITECTURE FOR A QUAD-BAND GSM/GPRS RADIO

RELATED APPLICATIONS

This application is a continuation of U.S. patent application Ser. No. 10/977,005 filed Oct. 29, 2004 (now U.S. Pat. No. 7,505,749).

This application is related to the following applications, each of which is incorporated herein by reference in its entirety for all purposes:

U.S. patent application Ser. No. 10/976,976 filed Oct. 29, 2004;
U.S. patent application Ser. No. 10/976,977 filed Oct. 29, 2004;
U.S. patent application Ser. No. 10/977,000 filed Oct. 29, 2004;
U.S. patent application Ser. No. 10/976,575 filed Oct. 29, 2004;
U.S. patent application Ser. No. 10/977,464 filed Oct. 29, 2004;
U.S. patent application Ser. No. 10/977,798 filed Oct. 29, 2004;
U.S. patent application Ser. No. 10/977,771 filed Oct. 29, 2004;
U.S. patent application Ser. No. 10/977,868 filed Oct. 29, 2004;
U.S. patent application Ser. No. 10/976,666 filed Oct. 29, 2004;
U.S. patent application Ser. No. 10/977,631 filed Oct. 29, 2004;
U.S. patent application Ser. No. 10/976,639 filed Oct. 29, 2004;
U.S. patent application Ser. No. 10/977,210 filed Oct. 29, 2004;
U.S. patent application Ser. No. 10/977,872 filed Oct. 29, 2004;
U.S. patent application Ser. No. 10/977,869 filed Oct. 29, 2004;
U.S. patent application Ser. No. 10/977,874 filed Oct. 29, 2004; and
U.S. patent application Ser. No. 10/976,996 filed Oct. 29, 2004.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to the processing of radio signals in a transceiver. More specifically, certain embodiments of the invention relate to a method and system for a synthesizer/local oscillator generator (LOGEN) architecture for a quad-band GSM/GPRS radio.

BACKGROUND OF THE INVENTION

A local oscillator generator (LOGEN) circuit is utilized in a conventional transceiver to generate oscillator reference signals. The oscillator reference signals generated by the LOGEN circuit are utilized by a transmitter and/or a receiver. Since different reference frequencies are required for transmitter and/or receiver operation, multiple local oscillator generators are utilized in conventional transceivers. For example, one or more LOGEN circuits may be utilized by the transmitter block and one or more LOGEN circuits may be utilized by the receiver block within a transceiver. For each LOGEN circuit, a conventional transceiver utilizes one or more calibration circuits that calibrate the LOGEN circuit for a specific frequency or a range of frequencies.

The LOGEN circuits within the transmitter and/or receiver block, however, occupy significant on-chip real estate within the conventional transceiver. In addition, additional on-chip real estate is required for the calibration circuits corresponding to each of the LOGEN circuits utilized within the transceiver. Further, by utilizing several LOGEN circuits, there is an increased possibility of inter-oscillator interference, which causes ineffective oscillator signal generation.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Certain embodiments of the invention may be found in a method and system for processing signals for a multiband radio. Aspects of the method may comprise dividing an input signal generated by an oscillator used to generate signals for each of a plurality of bands for the multiband radio. A feedback loop reference signal may be generated from the input signal and a coarse calibration signal may be generated from the feedback loop reference signal. The oscillator may be calibrated utilizing the coarse calibration signal. The input signal may be buffered and/or divided by a divide by four (4) divider circuit. The input signal generated by the oscillator may be between about 3.4 GHz and 4 GHz. The generated feedback loop reference signal may be buffered and/or divided prior to the calibration. The coarse calibration signal may comprise a 7-bit calibration signal. A fine calibration signal may be generated from the feedback loop reference signal. The oscillator may be calibrated utilizing the fine calibration signal. A transmitter (Tx) reference signal may be generated from the input signal.

Aspects of the system may comprise a first divider that divides an input signal generated by an oscillator used to generate signals for each of a plurality of bands for the multiband radio. A second divider may generate a feedback loop reference signal from the input signal. A calibration circuit may generate a coarse calibration signal from the feedback loop reference signal, where the calibration circuit may calibrate the oscillator utilizing the coarse calibration signal. The second divider may comprise a divide by four (4) divider circuit. A first buffer may buffer the input signal generated by the oscillator.

The input signal generated by the oscillator may be between about 3.4 GHz and 4 GHz. A second buffer may buffer the generated feedback loop reference signal. A third divider may divide the generated feedback loop reference signal prior to the calibration. The coarse calibration signal may comprise a 7-bit calibration signal. A fine calibration circuit may generate a fine calibration signal from the feedback loop reference signal and the fine calibration circuit may calibrate the oscillator utilizing the fine calibration signal. A fourth divider may generate a transmitter (Tx) reference signal from the input signal.

In another aspect of the invention, a synthesizer and LOGEN (Local Oscillator Generator) circuit for processing signals may comprise a multiband signal generator, wherein an output of the multiband signal generator is coupled to an input of a coarse calibration circuit and an input of a fine calibration circuit. An output of the coarse calibration circuit may be coupled to an input of a local oscillator and an output of the fine calibration circuit may be coupled to the input of the local oscillator. An output of the local oscillator may be coupled to an input of a first buffer and an output of the first buffer may be coupled to an input of the multiband signal generator. An output of the first buffer may be coupled to an input of a first divider and an output of the first divider may be coupled to an input of a second divider.

An output of the first buffer may be coupled to an input of a third divider and an output of the third divider may be coupled to an input of a second buffer. An output of the first buffer may be coupled to an input of a fourth divider and an output of the fourth divider may be coupled to an input of a third buffer. An output of the second buffer may be coupled to an input of the fine calibration circuit. An output of the multiband signal generator block may be coupled to an input of a fifth divider and an output of the fifth divider may be coupled to an input of a calibration circuit. An output of an oscillator reference frequency block may be coupled to the input of the calibration circuit and, for example, a 7-bit output of the calibration circuit may be coupled to the input of the local oscillator.

An output of the multiband signal generator may be coupled to an input of a sixth divider and an output of the sixth divider may be coupled to an input of a delta sigma modulator. An output of the delta sigma modulator may be coupled to an input of the sixth divider and the output of the sixth divider may be coupled to an input of a phase frequency detector. An output of an oscillator reference frequency block may be coupled to the input of the phase frequency detector and an output of the phase frequency detector may be coupled to an input of a charge pump. An output of the charge pump is coupled to an input of a loop filter and an output of the loop filter may be coupled to the input of the local oscillator.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a method and system for processing signals for a multiband radio. In accordance with an exemplary aspect of the invention, a synthesizer/local oscillator generator (LOGEN) architecture may utilize a single voltage controlled oscillator (VCO) to generate an oscillator reference signal that may be utilized in a multiband transceiver. For example, the synthesizer/LOGEN architecture may utilize one or more divider circuits that divide the oscillator signal to generate quad-band receiver (Rx) reference signals, such as a personal communication service (PCS) signal at about 1.9 GHz, a digital cellular system (DCS) signal at about 1.8 GHz, a global system for mobile communications (GSM) signal at about 900 MHz, and an Rx reference signal at 850 MHz.

Additional divider circuits may be utilized to generate a transmitter (Tx) reference signal and/or a feedback loop reference signal for coarse and/or fine calibration. The LOGEN circuit may utilize, for example, a 7-bit coarse calibration, which significantly improves the calibration speed. The 7-bit coarse calibration also results in a smaller gain for the VCO within the synthesizer/LOGEN architecture, as well as reduced noise within the generated signal. A fine calibration circuit may also be utilized to fine calibrate the VCO. A synthesizer/LOGEN circuit in accordance with an exemplary aspect of the invention, may be implemented utilizing fully differential and/or symmetric circuits, for example, resulting in better phase linearity and reduced sensitivity to coupling.

Figure 1:
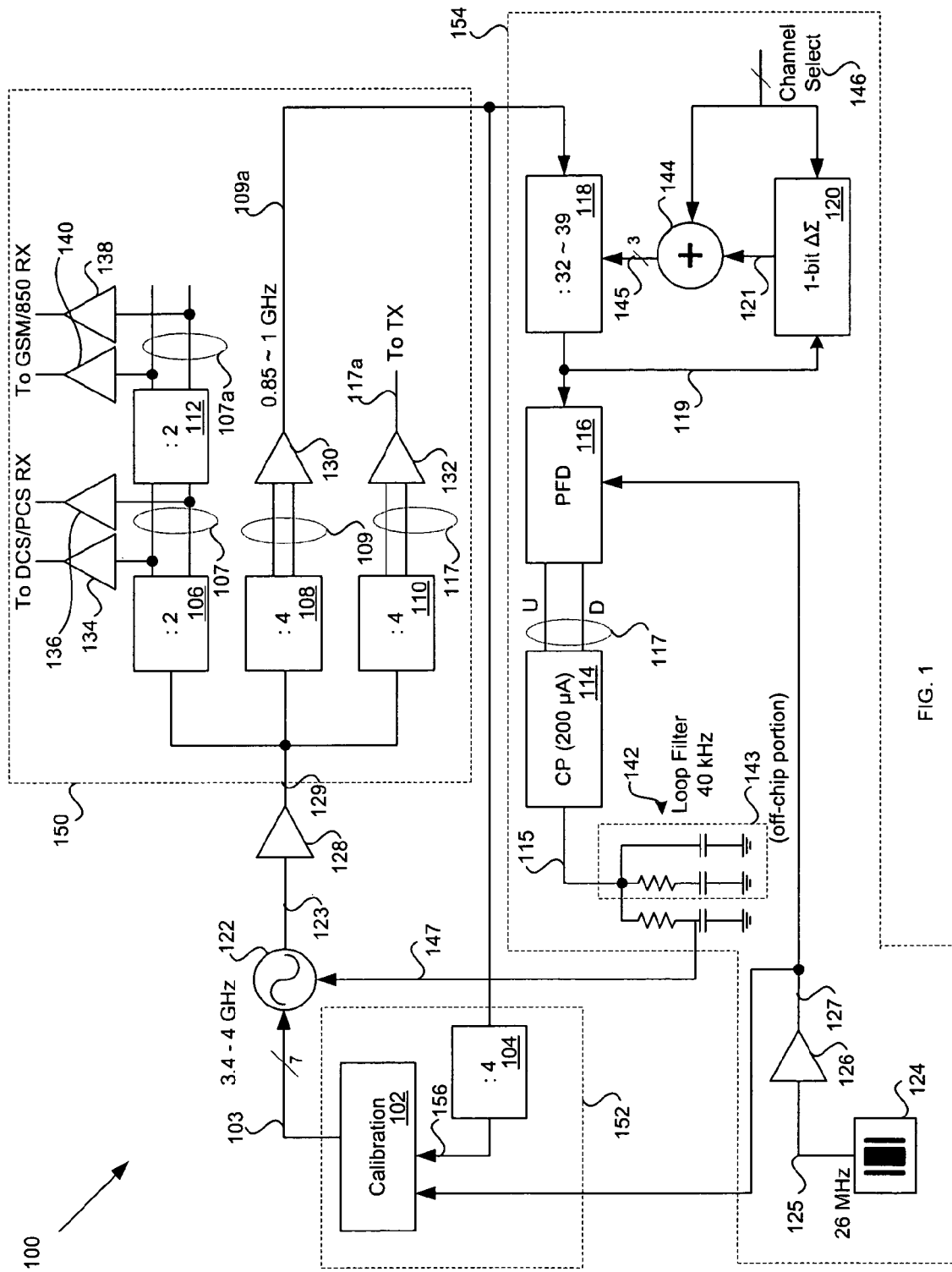
FIG. 1 is a circuit illustrating a synthesizer/local oscillator generator (LOGEN) architecture utilizing fractional-n synthesizer, in accordance with an embodiment of the invention.

FIG. 1 is a circuit illustrating a synthesizer/local oscillator generator (LOGEN) architecture utilizing fractional-n synthesizer, in accordance with an embodiment of the invention. Referring to FIG. 1, the synthesizer/LOGEN architecture 100 may comprise a voltage controlled oscillator (VCO) 122, buffer 128, multiband dividing block 150, coarse calibration circuit 152, and a fine calibration circuit 154.

The multiband dividing block 150 may comprise dividers 106 through 112 and buffers 130 through 140 and may be adapted to receive an oscillator signal 129 from the VCO 122 and generate one or more multiband Rx oscillator signals, such as Rx oscillator signals 107 and 107a, a feedback loop reference signal 109a, and a Tx oscillator signal 117a, for example. The dividers 106 through 112 may comprise suitable circuitry and/or logic and may be adapted to divide an input signal utilizing a determined dividing ratio. The buffers 130 through 140 may comprise suitable circuitry and/or logic and may be adapted to buffer and/or amplify an input signal.

The fine calibration circuit 154 may comprise a multi-modulus divider 118, a delta-sigma modulator 120, a combining block 144, a phase frequency detector 116, a charge pump 114, a loop filter 142, a reference signal oscillator 124, and a buffer 126. The fine calibration circuit 154 may be adapted to receive the feedback loop reference signal 109a, the reference oscillator signal 127, and the channel select signal 146, and utilize these received signals to generate a fine calibration signal 147, for example. The multi-modulus divider 118 may comprise suitable circuitry and/or logic and may be adapted to divide the feedback loop reference signal 109a utilizing a determined dividing ratio. The dividing ratio utilized by the multi-modulus divider 118 may utilize a fractional-n dividing ratio.

The delta-sigma modulator 120 may comprise suitable circuitry and/or logic and may be adapted to receive a channel select signal 146 and a divided signal 119 and modulate the multi-modulus divider 118 so that a dividing ratio corresponding to the channel select signal 146, and a selected frequency channel information, may be determined for use by the multi-modulus divider 118. In one aspect of the invention, the delta-sigma modulator 120 may generate a 1-bit bitstream signal 121, where the 1-bit bitstream 121 may represent an average level of the input signals to the delta-sigma modulator 120. By generating the 1-bit bitstream 121, the 1-bit delta-sigma modulator 120 may be less sensitive to the charge pump 114 and the nonlinearity of the multi-modulus divider 118, when compared to multi-bit delta-sigma modulators.

The 1-bit bitstream 121, as well as the channel select signal 146, may be communicated to the combining block 144. The combining block 144 may comprise suitable circuitry and/or logic and may be adapted to select either the 1-bit bitstream 121 or the channel select signal 146 for communication to the multi-modulus divider 118. After the combining block 144 selects between the 1-bit bitstream 121 and the channel select signal 146, an output signal 145 may be generated and communicated to the multi-modulus divider 118. The multi-modulus divider 118 may then adjust the dividing ratio, divide the feedback loop reference signal 109*a*, and generate a divided signal 119. The divided signal 119 may then be communicated to the phase frequency detector 116 as well as to the delta-sigma modulator 120 to be utilized as a feedback signal.

The phase frequency detector 116 may comprise suitable circuitry and/or logic and may be adapted to receive a divided signal 119 and a reference signal 127 and generate an output signal 117 based on the phase difference between the divided signal 119 and the reference signal 127. The output signal 117 may comprise an up (U) component and/or a down (D) component, based on whether the divided signal 119 leads or lags the reference signal 127. The charge pump 114 may comprise suitable circuitry and/or logic and may be adapted to receive the output signal 117 and generate positive or negative charge pulses 115 depending on whether the divided signal 119 leads or lags the reference signal 127.

The charge pulses 115 may then be integrated by the loop filter 142 to generate a fine calibration voltage signal 147. In one aspect of the invention, the loop filter may comprise a 40 kHz filter implemented with a plurality of resistance-capacitance (RC) links connected in parallel. For example, the loop filter 142 may comprise two RC links and a capacitor connected in parallel. The sub-section 143 of the loop filter 142, comprising one RC link and a capacitor, may be implemented off-chip, for example, and the remaining RC link may be implemented on-chip.

The crystal reference signal oscillator 124 may be adapted to generate a reference signal 125. The generated reference signal 125 may be buffered by the buffer 126 and the buffered reference signal 127 may then be communicated to the phase frequency detector 116 and/or to the coarse calibration module 102. In an exemplary aspect of the invention, the reference signal oscillator may generate a reference oscillator signal 125 at 26 MHz. The invention, however, may not be limited by the frequency of the oscillator signal 125 and other reference signals may also be utilized by the fine calibration circuit 154 and/or the coarse calibration circuit 152.

The coarse calibration circuit 152 may comprise a divider 104 and a coarse calibration module 102. The coarse calibration circuit 152 may be adapted to receive the feedback loop reference signal 109*a* and the reference oscillator signal 127 to generate, for example, a 7-bit coarse calibration signal 103. The coarse calibration signal 103 and the fine calibration signal 147 may be utilized by the VCO 122 for coarse and fine calibration of the generated oscillator signal 123 in accordance with the selected channel as determined by the channel select signal 146. The divider 104 may comprise suitable circuitry and/or logic and may be adapted to divide an input signal utilizing a determined dividing ratio. For example, the divider 104 may comprise a divide by four (4) dividing circuit and may be adapted to receive the feedback loop reference signal 109*a* and generate a divided signal 156. Although a 7-bit coarse calibration is utilized, the invention is not so limited. Coarse calibration utilizing a different number of bits may also be utilized.

The coarse calibration module 102 may comprise suitable circuitry and/or logic and may be adapted to receive the reference signal 127 and the divided signal 156 to generate a coarse calibration signal 103. In one aspect of the invention, the coarse calibration module 102 may utilize 7-bit coarse calibration signal generation techniques. For example, a 7-bit coarse calibration signal 103 may be selected from 128 different frequencies. The coarse calibration module 102 may be adapted to select a calibration signal that is close to one of the 128 reference frequencies. By utilizing 7-bit coarse calibration techniques, the coarse calibration module 102 may be adapted to quickly generate the coarse calibration signal 103. The coarse calibration signal 103 may then be communicated to the VCO 122 for coarse calibration followed by a fine calibration utilizing the fine calibration signal 147.

In operation, the VCO 122 may generate an oscillator signal 123. The oscillator signal 123 may be generated within a determined range, such as between about 3.4 GHz and 4 GHz, in accordance with a channel select signal 146. The channel select signal 146 may be a user-generated signal and may correspond to a selected channel associated with a frequency band, such as DCS, PCS, and/or GSM, for example. After the VCO 122 generates the oscillator signal 123, the oscillator signal 123 may be buffered by the buffer 128. The buffered oscillator signal 129 may then be communicated to the multiband dividing block 150 for further processing.

In one aspect of the invention, the multiband dividing block 150 may utilize divide by two (2) dividing circuits 106 and 112 to divide the oscillator signal 129 and generate multiband Rx oscillator signals 107 and 107*a*. For example, the divide by two (2) dividing circuit 106 may divide the oscillator signal 129 to generate the in-phase (I) and quadrature (Q) components of the multiband Rx oscillator signal 107. The in-phase (I) and quadrature (Q) components of the multiband Rx oscillator signal 107 may then be buffered by the buffers 134 and 136, respectively. The multiband Rx oscillator signal 107 may be between about 1.7 GHz and 1.9 GHz, for example, for Rx oscillator signal coverage in the DCS and PCS bands.

The multiband Rx oscillator signal 107 may then be further divided by the divide by two (2) dividing circuit 112 to generate the in-phase (I) and quadrature (Q) components of the multiband Rx oscillator signal 107*a*. The in-phase (I) and quadrature (Q) components of the multiband Rx oscillator signal 107*a* may then be buffered by the buffers 140 and 138, respectively. The multiband Rx oscillator signal 107*a* may be between about 850 MHz and 900 MHz, for example, for Rx oscillator signal coverage in the GSM band and the 850 MHz band.

In another aspect of the invention, the oscillator signal 129 may be utilized by the multiband dividing block 150 to generate the feedback loop reference signal 109*a*. For example, the oscillator signal 129 may be divided by the divide by four (4) dividing circuit 108 to generate the in-phase (I) and quadrature (Q) components of the feedback loop reference signal 109. The generated feedback reference signal 109 may then be buffered by the buffer 130 and the buffered feedback loop reference signal 109*a* may be communicated to the fine calibration circuit 154 and/or the coarse calibration circuit 152. The feedback loop reference signal 109*a* may be between about 850 MHz and 1 GHz, for example, and may be utilized for the generation of the coarse calibration and fine calibration signals 103 and 147, respectively. The present invention may not be limited by the frequency range of the VCO generated oscillator signal 123 and the feedback loop reference signal 109*a*. Therefore, frequency ranges other than a VCO generated oscillator frequency range of about 3.4 GHz to 4 GHz may also be utilized within the synthesizer/LOGEN architecture 100.

The oscillator signal 129 may also be utilized by the multiband dividing block 150 to generate the Tx oscillator signal 117*a*. For example, the oscillator signal 129 may be divided by the divide by four (4) dividing circuit 110 to generate the in-phase (I) and quadrature (Q) components of the Tx oscillator signal 117. The Tx oscillator signal 117 may then be buffered by the buffer 132 and the buffered Tx oscillator signal 117*a* may be communicated to a transmitter block, for example, for further processing.

After the feedback loop reference signal is generated by the multiband dividing block 150, the feedback loop reference signal may be communicated to the fine calibration circuit 154 and the coarse calibration circuit 152. In one aspect of the invention, the fine calibration circuit 154 may comprise a fractional-n synthesizer adapted to generate the fine calibration signal 147. The multi-modulus divider 118 may receive and divide the feedback loop reference signal 109*a* utilizing a determined dividing ratio. The dividing ratio utilized by the multi-modulus divider 118 may comprise a fractional-n dividing ratio. For example, if the feedback loop reference signal is between about 850 MHz and 1 GHz, the multi-modulus divider 118 may utilize a fractional dividing ratio of about 32.0 to 39.0. In this manner, the divided signal 119 may be about 25-26 MHz, which signal may then be compared with the reference oscillator signal 127 in the phase frequency detector 116.

The delta-sigma modulator 120 may receive a channel select signal 146 and a divided signal 119 and modulate the multi-modulus divider 118 so that a dividing ratio corresponding to the channel select signal 146, and a selected frequency channel information, may be determined for use by the multi-modulus divider 118. The delta-sigma modulator 120 may be adapted to generate, for example, a 1-bit bitstream signal 121, for example, where the 1-bit bitstream 121 may represent an average level of the input signals to the delta-sigma modulator 120.

The 1-bit bitstream 121, as well as the channel select signal 146, may be communicated to the combining block 144. The combining block 144 may select either the 1-bit bitstream 121 or the channel select signal 146 for communication to the multi-modulus divider 118. After the combining block 144 selects between the 1-bit bitstream 121 and the channel select signal 146, an output signal 145 may be generated and communicated to the multi-modulus divider 118. The multi-modulus divider 118 may then adjust the dividing ratio, divide the feedback loop reference signal 109*a*, and generate a divided signal 119. The divided signal 119 may then be communicated to the phase frequency detector 116 as well as to the delta-sigma modulator 120.

The phase frequency detector 116 may receive the divided signal 119 and a reference signal 127 from the reference oscillator 124, and generate an output signal 117 based on the phase difference between the divided signal 119 and the reference signal 127. The output signal 117 may comprise an up (U) component and/or a down (D) component, based on whether the divided signal 119 leads or lags the reference signal 127. The charge pump 114 may be adapted to receive the output signal 117 and generate positive or negative charge pulses 115 depending on whether the divided signal 119 leads or lags the reference signal 127. The charge pulses 115 may then be integrated by the loop filter 142 to generate a fine calibration signal 147. After the fine calibration signal 147 is generated by the loop filter 142, the fine calibration signal 147 may be communicated to the VCO 122 for fine calibration.

After the feedback loop reference signal 109*a* is generated by the multiband dividing block 150, the feedback loop reference signal 109*a* may also be communicated to the coarse calibration circuit 152 for further processing. The coarse calibration circuit 152 may be adapted to receive the feedback loop reference signal 109*a* and the reference oscillator signal 127 to generate a 7-bit coarse calibration signal 103. The coarse calibration signal 103 and the fine calibration signal 147 may be utilized by the VCO 122 for coarse and fine calibration of the generated oscillator signal 123 in accordance with the selected channel as determined by the channel select signal 146.

The feedback loop reference signal 109*a* may be initially communicated to the divider 104. The divider 104 may divide the feedback loop reference signal 109*a* and generate a divided signal 156. The coarse calibration module 102 may receive the reference signal 127 and the divided signal 156 to generate a coarse calibration signal 103. In one aspect of the invention, the coarse calibration module 102 may utilize 7-bit coarse calibration signal generation techniques. For example, a 7-bit coarse calibration signal 103 may be selected from 128 different frequencies. The coarse calibration module 102 may be adapted to select a calibration signal that is close to one of the 128 reference frequencies. The coarse calibration signal 103 may then be communicated to the VCO 122 for coarse calibration followed by a fine calibration utilizing the fine calibration signal 147.

Figure 2:
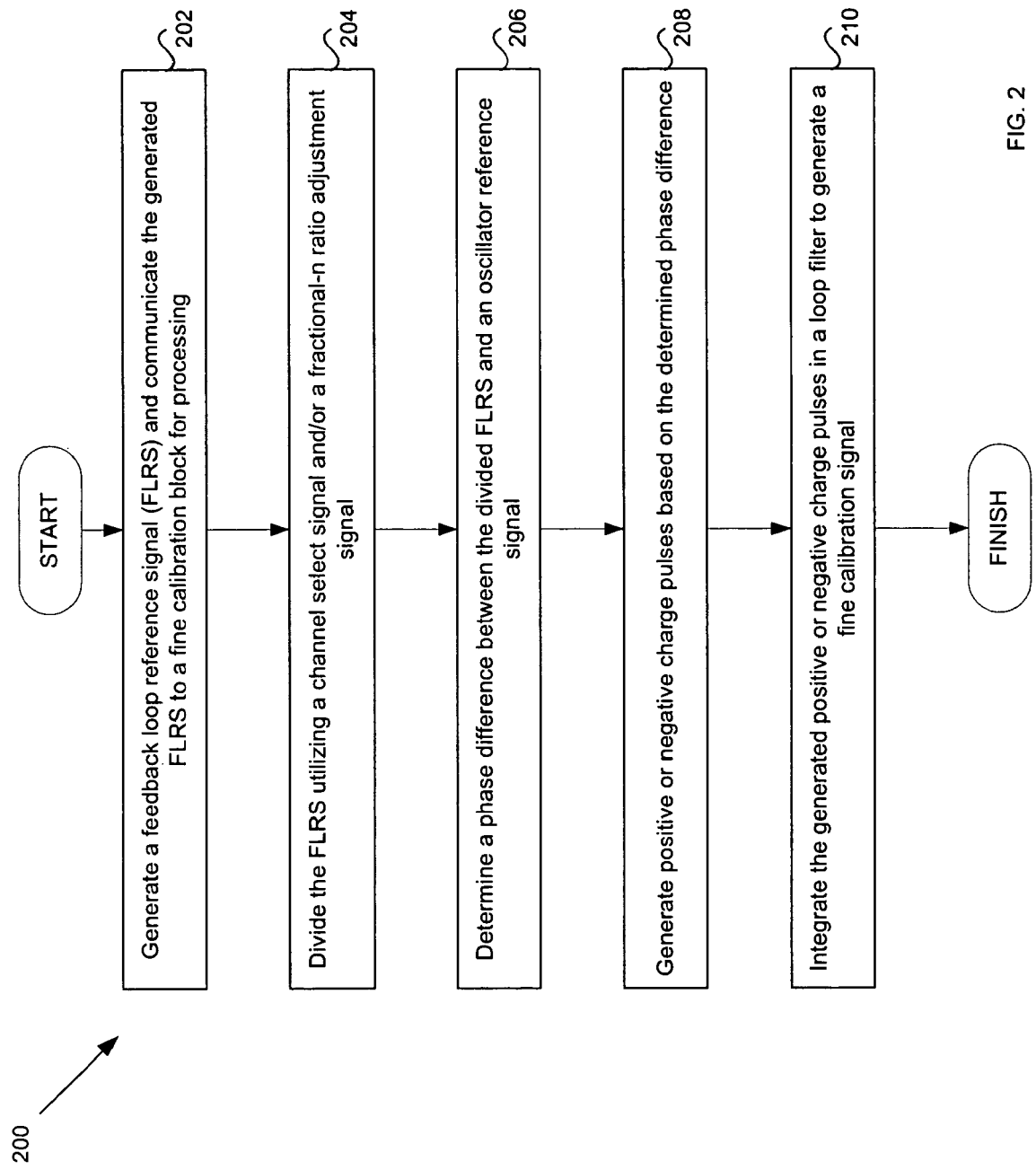
FIG. 2 is a flow diagram of an exemplary method for generating a fine calibration signal, in accordance with an embodiment of the invention.

FIG. 2 is a flow diagram of an exemplary method 200 for generating a fine calibration signal, in accordance with an embodiment of the invention. Referring to FIG. 2, at 202, a feedback loop reference signal may be generated and communicated to a fine calibration block for processing. At 204, the feedback loop reference signal may be divided by a fractional-n divider. The fractional-n divider may utilize a channel select input signal and/or a fractional-n dividing ratio adjustment signal to divide the feedback loop reference signal. At 206, a phase difference may be determined between the divided feedback loop reference signal and an oscillator reference signal. At 208, positive or negative charges may be generated based on the determined phase difference between the divided feedback loop reference signal and an oscillator reference signal. For example, positive or negative charges may be generated by a charge pump. At 210, the generated positive or negative charges may be integrated in a loop filter to generate a fine calibration signal.

Figure 3:
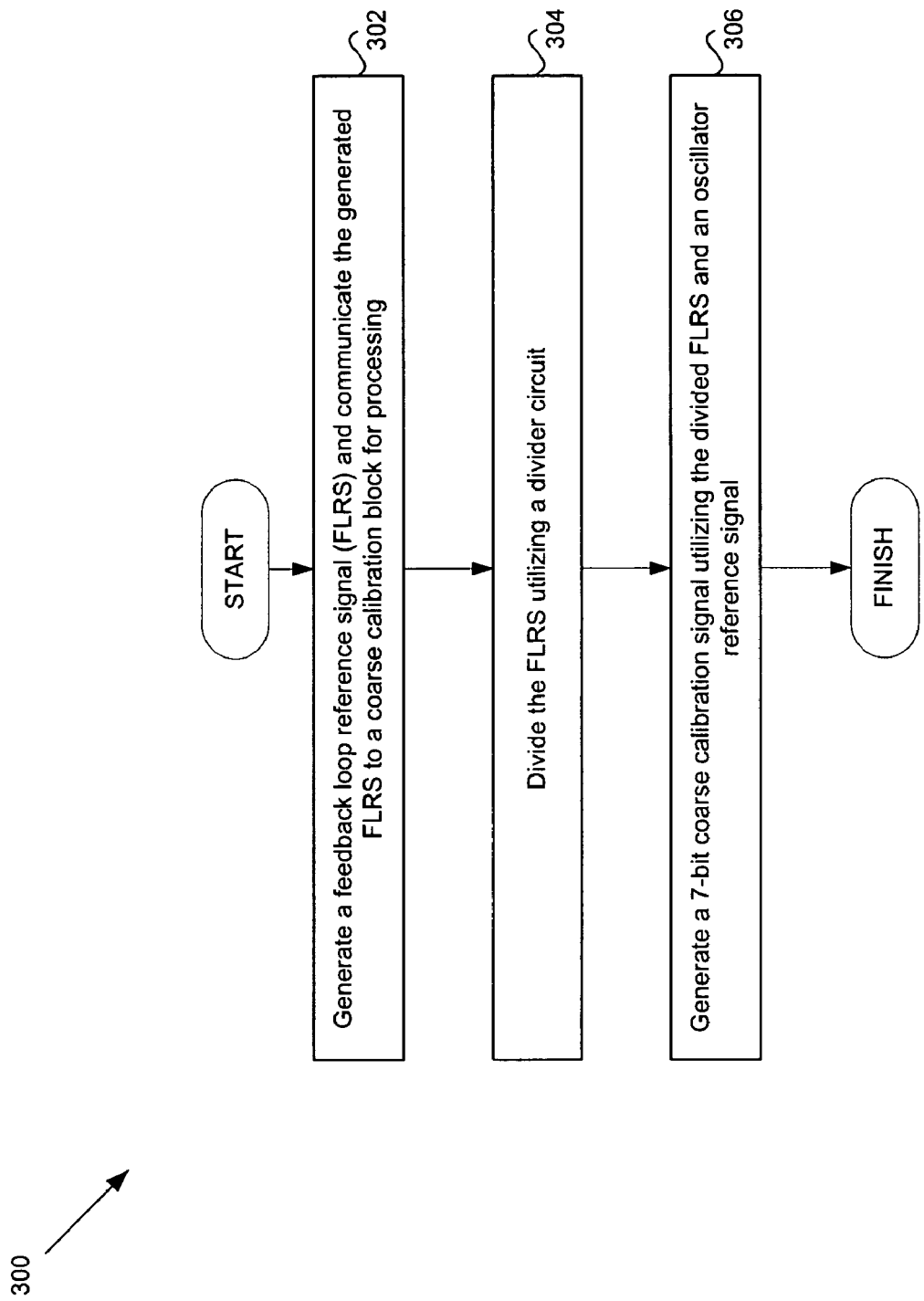
FIG. 3 is a flow diagram of an exemplary method for generating a coarse calibration signal, in accordance with an embodiment of the invention.

FIG. 3 is a flow diagram of an exemplary method 300 for generating a coarse calibration signal, in accordance with an embodiment of the invention. Referring to FIG. 3, at 302, a feedback loop reference signal may be generated and communicated to a coarse calibration block for processing. At 304, the generated feedback loop reference signal may be divided utilizing a divider circuit. At 306, a 7-bit coarse calibration signal utilizing the divided feedback loop reference signal and an oscillator reference signal.

Accordingly, aspects of the invention may be realized in hardware, software, firmware or a combination thereof. The invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing signals, the method comprising:
   performing using one or more circuits in a multiband radio, functions comprising:
      receiving an input signal from an oscillator that generates signals for each of a plurality of bands handled by said multiband radio;
      dividing said received input signal;
      generating a feedback loop reference signal from said input signal;
      generating a coarse calibration signal and/or a fine calibration signal from said generated feedback loop reference signal; and
      calibrating said oscillator utilizing one or both of said coarse calibration signal and/or said fine calibration signal.

2. The method according to claim 1, wherein said input signal generated by said oscillator is between about 3.4 GHz and 4 GHz.

3. The method according to claim 1, comprising buffering said receive input signal.

4. The method according to claim 1, comprising buffering said generated feedback loop reference signal.

5. The method according to claim 1, comprising dividing said input signal by a divide by four (4) divider circuit, wherein said one or more circuits comprises said divide by four (4) divider circuit.

6. The method according to claim 1, comprising generating a transmitter (Tx) reference signal from said received input signal.

7. The method according to claim 1, wherein said coarse calibration signal comprises 7-bit calibration signal.

8. The method according to claim 1, wherein said one or more circuits comprise a synthesizer and local oscillator generator (LOGEN) circuit.

9. A system for processing signals, the system comprising:
   one or more circuits for use in a multiband radio, wherein said one or more circuits are operable to:
      receive an input signal from an oscillator that generates signals for each of a plurality of bands handled by said multiband radio;
      divide said received input signal;
      generate a feedback loop reference signal from said input signal;
      generate a coarse calibration signal and/or a fine calibration signal from said generated feedback loop reference signal; and
      calibrate said oscillator utilizing one or both of said coarse calibration signal and/or said fine calibration signal.

10. The system according to claim 9, wherein said input signal generated by said oscillator is between about 3.4 GHz and 4 GHz.

11. The system according to claim 9, wherein said one or more circuits are operable to buffer said receive input signal.

12. The system according to claim 9, wherein said one or more circuits are operable to buffer said generated feedback loop reference signal.

13. The system according to claim 9, wherein said one or more circuits are operable to divide said input signal by a divide by four (4) divider circuit, wherein said one or more circuits comprises said divide by four (4) divider circuit.

14. The system according to claim 9, wherein said one or more circuits are operable to generate a transmitter (Tx) reference signal from said received input signal.

15. The system according to claim 9, wherein said coarse calibration signal comprises 7-bit calibration signal.

16. The system according to claim 9, wherein said one or more circuits comprise a synthesizer and LOGEN circuit.

* * * * *